Jan. 10, 1939.    G. M. WRIGHT    2,143,178
RADIO DIRECTION FINDING SYSTEM
Filed Jan. 16, 1937    2 Sheets-Sheet 1

INVENTOR
GEORGE MAURICE WRIGHT
BY
ATTORNEY

Jan. 10, 1939.  G. M. WRIGHT  2,143,178

RADIO DIRECTION FINDING SYSTEM

Filed Jan. 16, 1937  2 Sheets-Sheet 2

INVENTOR
GEORGE MAURICE WRIGHT.
BY
ATTORNEY

Patented Jan. 10, 1939

2,143,178

UNITED STATES PATENT OFFICE 2,143,178

RADIO DIRECTION FINDING SYSTEM

George Maurice Wright, Broom Hall, Woodham Ferrers, England, assignor to Radio Corporation of America, a corporation of Delaware Application January 16, 1937, Serial No. 120,837
In Great Britain November 20, 1935

4 Claims. (Cl. 250—11)

This invention relates to direction finding radio receiving systems and has for its object to provide an improved direction finding radio receiving system wherein direct visual indication of the direction of an incoming signal is given and which shall be as free as possible from difficulties and false readings caused by "jamming" and undesired signals generally. More specifically the invention relates to direction finding radio receiving systems of the kind wherein the direction of an incoming signal is obtained by utilizing a plurality of differently directed directional receiving arrangements and comparing the signals picked up thereby or by utilizing a receiving aerial system including a member having directional qualities, changing the effective phase of connection of said system to a receiver so as in effect to change the directional diagram and comparing the signals picked up. As a rule where differently directed directional receiving arrangements are employed the said arrangements are so constructed that their directivities can be varied simultaneously and such variation is effected until the signals to be compared are of like intensity, the occurrence of this condition serving to indicate the incoming signal direction.

The invention will be further explained in connection with the accompanying drawings in which.

Figure 1:
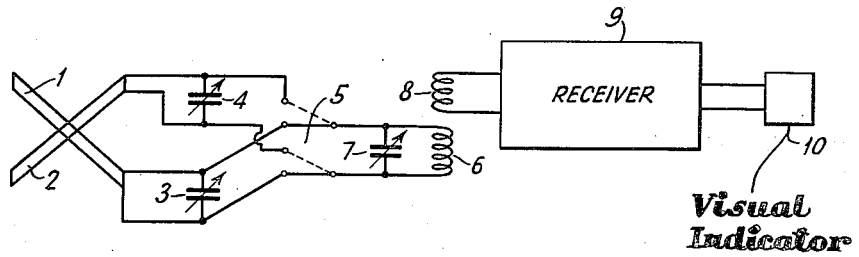
Figure 1 shows diagrammatically a directional receiving system embodying basic structure upon which my improvements are built.

In order that the invention may be the better understood consider first the case, diagrammatically illustrated in Fig. 1, of a directional receiving system comprising a pair of mutually perpendicular frames 1, 2, arranged to be rotatable as a unit (by means not shown), each frame being tuned by a shunt variable condenser 3 or 4. A two-way switch 5 is provided and so connected that in one position of the switch (that shown in full lines) one frame 1 with its condenser 3 is connected across a parallel tuned circuit constituted by an inductance 6 shunted by a condenser 7, while in the other position of the switch (that shown in broken lines) the other frame 2 with its tuning condenser 4 is connected across the parallel tuned circuit 6, 7. The inductance 6 is coupled to the input coil 8 of a radio receiver proper 9 whose output feeds into a simple amplitude responsive visual indicator 10, such as a milliammeter. If all the three tuned circuits 1, 3; 2, 4; and 6, 7 are all tuned to the incoming frequency from the station whose direction is to be ascertained, the two-way switch can be thrown from one position into the other without disturbing the tuning and by moving the said switch quickly from one position to the other the signal strengths picked up upon the individual frames can be compared. If the whole structure constituted by the two frames 1, 2 is rotated until movement of the switch causes no change in the indication given by the indicator, this setting of the frame structure should give the direction of the incoming signals.

The system of Fig. 1 will, however, present the difficulty that any "jamming" station which does not lie either in the plane of the station desired to be received or in a plane at right angles to that plane will give rise to a difference between the indications obtained for the two positions of the two-way switch and since the indicator is merely a milliammeter there is no discrimination between wanted and unwanted signals, and accordingly interference and false readings may occur.

According to this invention a directional receiving system of the kind referred to is characterized in that the signals to be compared are compared by indicator means so constructed and arranged as not merely to respond to what may be termed the integrated signals, but to give an indication corresponding to the signals themselves, thus enabling distinction to be made by observation between the desired signals and interfering signals.

Preferably a signal indicating device constituted by a cathode ray tube is employed and relatively high speed switching means are provided for feeding (via the receiver proper) the signals to be compared successively to said cathode ray tube, said high speed switching means being purely electrical in action. A feature of the invention resides in the high speed switching means in question.

There will now be described one embodiment of the invention wherein the said invention is applied to a directional receiving system employing mutually perpendicular frames arranged to be rotated together. It is to be understood, however, that the invention is not limited to its application to directional receiving systems of this nature but is applicable generally to all systems of the kind referred to involving visual comparison of directionally obtained signals.

Figure 2:
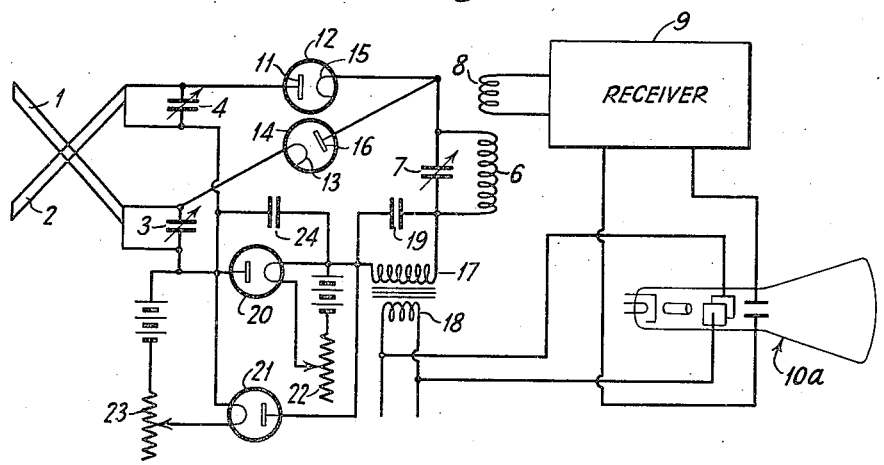
Fig. 2 illustrates certain of these improvements.

In the embodiment illustrated in Fig. 2 there are two mutually perpendicular frames 1, 2, arranged to be rotated together as a single structure and each frame is shunted by a tuning condenser 3 or 4 as before. One terminal of one tuning condenser 3 is connected to one terminal of the condenser 4 as shown. Of the remaining two condenser terminals one is connected to the anode 11 of a diode 12 (any other form of rectifier of low internal impedance, for example, about 200 ohms, may be used) and the other is connected to the cathode 13 of a similar diode 14 or other rectifier. The cathode 15 of the diode 12 is connected to the anode 16 of the diode 14 and also to one terminal of a parallel tuned circuit 6, 7, whose other terminal is connected to the common terminal of the frame tuning condensers through the secondary 17 of a low frequency transformer. The inductance 6 is coupled to the input coil 8 of the receiver proper 9 which feeds (as will be described later) into an indicator 10a constituted by a cathode ray tube having mutually perpendicular ray deflecting means and provided with the usual fluorescent screen. Low frequency alternating potentials from a source (not shown) are fed to the primary 18 of the low frequency transformer the secondary 17 thereof being shunted by a condenser 19 which constitutes in effect a short circuit for the radio frequency. The output of the radio receiver proper 9 is applied to one of the mutually perpendicular cathode ray deflecting means of the tube at 10a and the other cathode ray deflecting means of the tube are energized from the same low frequency supply which is fed to the low frequency transformer primary 18.

With this arrangement it will be seen that when the anode of any diode is positive with respect to its cathode that diode, which is as stated of low characteristic impedance, for example, 200 ohms, will constitute virtually a short circuit as respects the radio frequency, and accordingly one terminal of the frame which is connected to the anode of that diode will be in effect directly connected to one terminal of the tuned circuit 6, 7. When, however, the cathode of a diode is positive with respect to its anode that diode will constitute in effect an open circuit. Since the diodes are connected back to back the two diodes in conjunction with the low frequency alternating current supply to the transformer 18, 17, will constitute a switching arrangement for alternatively switching in the two frames, the speed of operation of the said switching arrangement being determined by the periodicity of the low frequency alternating current.

Accordingly when the apparatus is working the pattern produced on the screen of the tube will consist of two sections side by side, one being an oscillographic picture of the signals from one frame, and the other a picture of the signals from the other frame. The structure comprising the two frames is rotated until equal amplitude deflections are obtained, i. e., until the two pictures indicate that the signal strength upon the two frames is equal. This gives the direction of the incoming signals. If there is any "jamming" by undesired signals this can be easily seen, for even though undesired signals be present the general level of the wanted signals can be seen in the patterns produced on the cathode ray tube screen despite the momentary unwanted deflections produced by interference.

In practice certain obvious precautions should be taken to prevent false readings and indications due to such causes as inter-electrode capacity in the diodes and open antenna effects in the frames. The precautions taken in any particular case will, of course, depend upon the detail arrangement and are such as will be apparent to any person skilled in the art, for example, self-capacity effects in the diodes may be eliminated or minimized by well known capacity neutralizing circuits.

The periodicity of the low frequency alternating current supply to the transformer 18, 17, is preferably chosen sufficiently high for the patterns upon the fluorescent screen of the tube to persist visually.

It will be noted that the switching arrangement in the embodiment of Fig. 2 is substantially inertialess and that, since the diode impedances are very small as compared to the impedances of the circuits which feed into them and into which they feed, the said diodes will have substantially no adverse effects as respects working frequencies. Owing to the low impedances of the diodes it is found in practice that normal variations in characteristics from diode to diode of diodes of the same type do not produce any appreciable effect upon the indications given and consequently a worn or broken diode can be replaced by a new one of the same type without adversely affecting the performance of the equipment.

In use, of course, the two frames 1, 2, with their shunt condensers 3, 4, and the tuned circuits 6, 7, are all tuned to the frequency of the incoming signal whose direction is to be determined.

An important subordinate feature of the invention consists in providing in the low frequency "switching circuit" means which present high impedance to the "switching frequency" but low impedance to the high frequency in the circuits to be "switched". Such means may preferably include a network comprising a saturation device shunted by a suitable condenser.

The feature of improvement mentioned in the foregoing paragraph avoids a difficulty that would be encountered in the operation of the circuit of Fig. 2 thus far described. The difficulty appears to be that the use of relatively large current-capacity diodes or other rectifiers 12 and 14 would be necessary in order to provide the on-and-off switching action in such manner that the switching voltage shall be applied in as short a time as possible. Where the available switching voltage is sinusoidal or approximately so the diodes 12 and 14 will exhibit a relatively high peak emission if a rapid switch-over is to be obtained, since, if the switching action is to occur at the moment when a diode plate becomes slightly positive with relation to its cathode, the diode must remain of low resistance (and, therefore, pass a substantial current) right up to the maximum voltage applied between its anode and cathode.

In view of these circumstances I find it preferable to employ, in the low frequency switching circuit which includes the transformer secondary 17, a network having a pair of saturated diodes 20 and 21 connected with opposing directions of space current flow. These diodes act as current limiting impedances and their limiting currents may be adjusted by adjusting rheostats 22, 23, in the filament circuits. Shunted across the diodes 20, 21, is a condenser 24, of such value as to present low impedance to the high frequency from the frames 1, 2, but high impedance to the switching frequency from transformer 16, 17.

Figure 3:
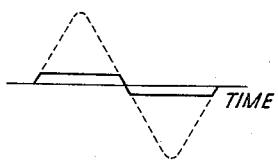
Fig. 3 shows the operation of a limiting device as used in my system.

In use the diodes 20, 21 are adjusted so that the switching diodes 12, 14, operate on the steep part of the characteristic curve. The action will be seen on reference to the curves of Fig. 3 in which the broken line curve represents a full wave of potential applied to the transformer 16, 17, and the full line curve the resultant current wave one half of which flows in the circuit including the diodes 20 and 14 and the circuit 6, 7, and the other half of which flows through the circuit including the diodes 21, and 12 and the circuit 6, 7. It will be observed that the full line curve rapidly reaches the limiting value (positive or negative as the case may be) and remains constant at that value for the greater part of a half cycle, then rapidly returns to zero. Since the limiting values of current are chosen to correspond to the steep parts of the characteristics of the diodes 12 and 14, the required high speed switching operation is obtained but the maximum currents to be carried by the diodes 12 and 14 is limited to relatively low values, the high frequency components being by-passed by the condenser 24.

Obviously limiting devices other than saturated diodes can be employed, for example, use may be made of devices such as the pentode valve or the so-called electron-beam valve. Again a simple resistance shunted by a by-pass condenser may be employed in lieu of the saturated diode network of Fig. 2, but this is not so advantageous in practice as the use of saturated current devices.

Figure 4:
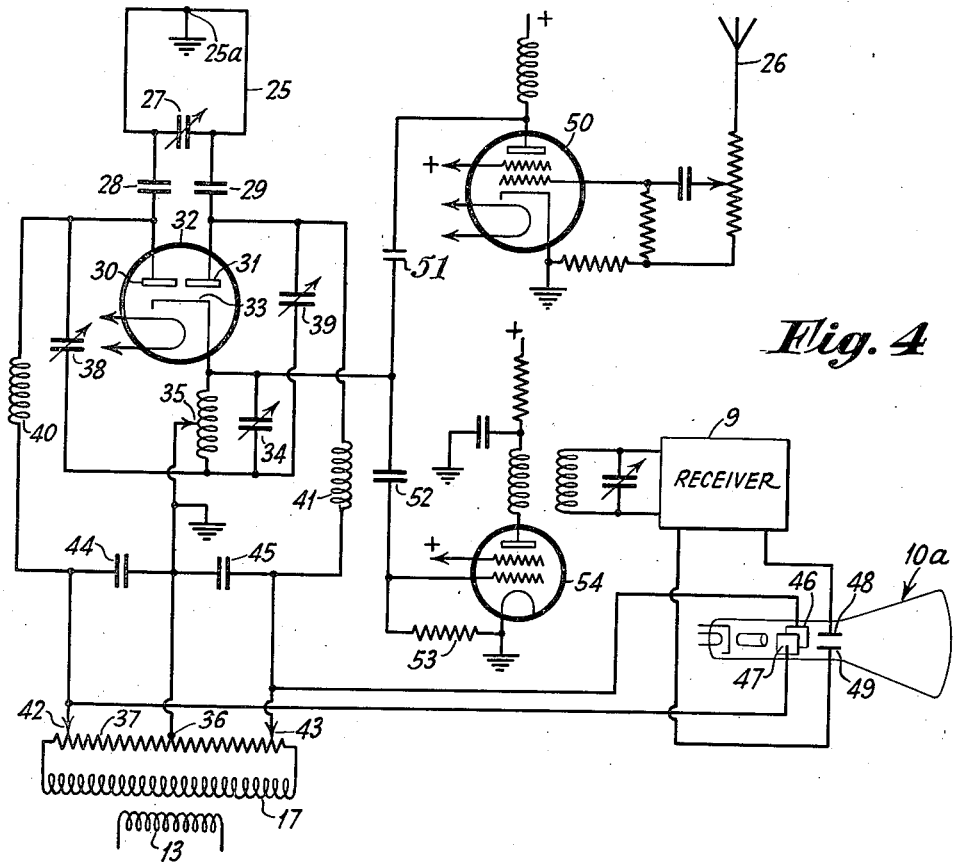
Fig. 4 shows a modification having a single loop aerial.

The accompanying Fig. 4 shows an embodiment wherein there is employed a single rotatable frame aerial 25 in conjunction with an open aerial 26 in place of two directional aerials.

In Fig. 4 the frame 25, which is earthed at its midpoint 25a and tuned by a condenser 27 is connected through blocking condensers 28, 29, to the anodes 30, 31, of a double diode 32 having a cathode 33 shown as of the indirectly heated type. The cathode 33 is connected to one end of a tuned circuit 34 having its mid-point 35 earthed and connected to the mid-point 36 of a potentiometer resistance 37 across which low frequency potentials from a source (not shown) are applied via a transformer 16, 17. The other end of the tuned circuit 34 is connected through neutralizing condensers 38, 39, to the anodes 30, 31, to which are also applied via high frequency chokes 40, 41, low frequency potentials derived from symmetrical taps 42, 43, on the resistance 37. By-pass condensers 44, 45, are connected between the taps 42, 43, and earth. The taps 42, 43, are also connected to one pair 46, 47, of deflector plates of a cathode ray indicator tube 10a having a second pair of plates 48, 49, perpendicular to the first pair. Signals obtained on the open aerial 26 are amplified by a valve 50 and applied via a condenser 51 and a grid condenser and grid leak combination 52, 53, to the control grid of a valve 54, shown as a screen grid valve. The cathode 33 of the rectifier tube 32 is also connected via the combination 52, 53, to the control grid of the valve 54 whose output circuit feeds into a receiver proper 9, the output from which is applied across the deflector plates 48, 49.

Figure 5:
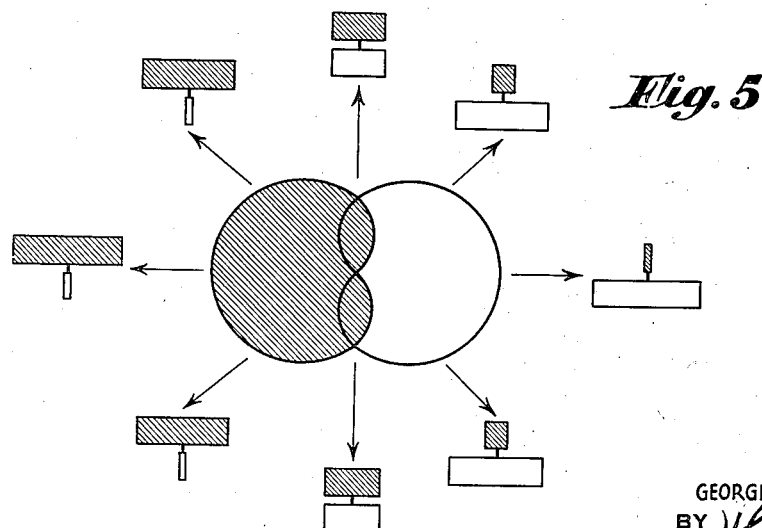
Fig. 5 shows how certain cardioidal field patterns are used in my system.

With this arrangement the low frequency voltage fed in via transformer 16, 17, causes deflection in one direction in the cathode ray tube and this same voltage is also applied to the anodes 30, 31. Owing to the mid-tap 36 the E. M. F.'s on the two anodes 30, 31 are in opposite phase so that during one half cycle one diode in the double diode receives a positive voltage and the other a negative one. In consequence, during this half-cycle, one diode offers very low resistance and the other offers a resistance of the order of several megohms. In the next half cycle the conditions, of course, reverse. Accordingly, at any instant the tuned frame aerial circuit 25, 27, is connected to the cathode tuned circuit 34, through whichever diode is, at that instant, receiving a positive voltage. The circuits 25, 27 and 34 are, of course, tuned to the working frequency. As will be appreciated, the low frequency fed in via transformer 16, 17, acts as a switching frequency to cause the two diodes in the double diode to be alternately active and since the output from the receiver 9 is applied to the second pair of plates 48, 49, there will be produced, on the fluorescent screen, side by side representations of the radio frequency voltages developed at the diode anodes. Bearings by equi-signal observations are obtained by virtue of the fact that, in the system of Fig. 4, the observed radio frequency amplitude is in accordance with a cardioid polar diagram. Since the E. M. F.'s at the diode anodes are, as already stated, in opposed phase, the cardioid diagram is in effect reversed 180° at each anode and accordingly the amplitudes indicated by the two anodes will appear as equal patterns only when the frame aerial is oriented into a position where the "minimum" of each cardioid is at 90° to the incoming signal direction. This is shown in conventional fashion in Fig. 5 in which the mutually reversed cardioids are shown. The radiating arrows in Fig. 5 represent different frame orientations and the two rectangles opposite the end of each arrow represent the two patterns on the screen of the cathode ray tube. The incoming signal direction is that for which the two patterns are equal and it will be observed that, when the frame is at right angles to this direction, one rectangle becomes a line. The sense may be determined by rotating the frame and noting which pattern increases. In Fig. 5 one cardioid, and the patterns corresponding thereto, are shown shaded.

There are, of course, many known means of producing cardioid shaped diagrams and any such means may be substituted for the particular aerial arrangement shown in Fig. 4.

In Fig. 4 the valve 50 is preferably an electron beam valve since such valves are of very low anode-cathode self-capacity and the said valve is shown as choke capacity coupled as regards its output circuit, which, like the input circuit of the said valve, is designed by suitable choice of the circuit components, to give the correct amplitude and phase of output. The condenser 51 may be as low in value as 50 micro-microfarads and the extremely low shunt capacity given by the valve and condenser 50, 51 when the valve is as just stated, greatly facilitates ganging of the circuit 34. The input circuit to the valve 50 is of normal design and is only conventionally represented.

In Fig. 4 the condensers 38, 39 are neutralizing condensers. In some cases the capacities of the diodes will be sufficient to give residual capacity coupling to the circuit 34. By careful arrangement of the circuits, however, this may be usually reduced to a negligible amount with respect to the maximum amplitude which can be dealt with on the cathode ray tube screen and then neutralizing may be dispensed with.

The chokes 40, 41, prevent the passage of radio frequency currents to earth through the switching frequency circuits and the combination 52, 53, prevents the application of the low frequency switching voltage direct to the control grid of the valve 54.

I claim:

1. In a system of the class described, a rectifier of the double diode type, each diode comprising a cathode and an anode, an orientable frame aerial, earthed at its mid-point and coupled between the anodes of said rectifier, connections from a common cathode point in said rectifier to said anodes through paths including a tuned circuit common thereto, means for applying a switching wave to said diode anodes in phase opposition to render said diodes alternately conductive, an indicator comprising a cathode ray tube having a fluorescent screen, means for applying said wave to one of a pair of co-ordinate ray deflector means in said cathode ray tube, an open aerial, means for superimposing signals derived from said open aerial on signals derived from said tuned circuit, and means for applying signals corresponding with the superimposed or mixed signals to the other of said pair of co-ordinate ray deflector means.

2. A directional receiving system comprising a plurality of aerials, at least one of said aerials being of the directional loop type, electronic switching means comprising rectifying means of the diode type for deriving demodulated signals from said aerials, means for causing said rectifying means to differentiate between signals collected by different aerials, a cathode ray tube indicator having horizontal and vertical deflecting circuits, a local source of alternating potential fed to said switching means for actuating the same, and means for causing said switching means to apply signals derived successively from separate ones of said aerials to one of said deflecting circuits while causing said alternating potential to be fed to the other of said deflecting circuits.

3. A system in accordance with claim 2 and further characterized in that said rectifying means comprises diode discharge tubes operable when saturated as current limiting impedances, said system also having capacitive means for offering a low impedance to the rectified signaling currents and a high impedance to the alternating current from said local source fed to said switching means.

4. A system in accordance with claim 2 and having a receiver interposed between said rectifier and one pair of said deflecting circuits, and further characterized in that said aerials comprise crossed loops each respective loop being connected to a different portion of said rectifying means and the different portions of the rectifying means being connected through a common coupling device to said receiver, one of the portions of the rectifying means being conductive in one direction and the other portion in the opposite direction through said coupling device.

GEORGE MAURICE WRIGHT.